(12) United States Patent
Parnaby

(10) Patent No.: US 7,327,224 B2
(45) Date of Patent: Feb. 5, 2008

(54) VEHICLE SECURITY SYSTEM

(75) Inventor: Michael Boyden Parnaby, Morningside (ZA)

(73) Assignee: PFK Electronics (Pty) Ltd., Durban State (ZA)

( * ) Notice: Subject to any disclaimer, the term of this patent is extended or adjusted under 35 U.S.C. 154(b) by 0 days.

(21) Appl. No.: 11/145,923

(22) Filed: Jun. 7, 2005

(65) Prior Publication Data

US 2005/0270144 A1    Dec. 8, 2005

(30) Foreign Application Priority Data

Jun. 7, 2004    (ZA) ................................ 2004/4476

(51) Int. Cl.
*B60Q 1/00* (2006.01)
(52) U.S. Cl. ................. 340/425.5; 340/426.1; 340/429; 340/430; 340/426.11; 340/426.13
(58) Field of Classification Search ............ 340/425.5, 340/426.1, 429, 430, 426.11, 426.13, 426.16, 340/426.17
See application file for complete search history.

(56) References Cited

U.S. PATENT DOCUMENTS

| | | | | |
|---|---|---|---|---|
| 5,117,217 A | * | 5/1992 | Nykerk | 340/426.23 |
| 5,173,881 A | * | 12/1992 | Sindle | 367/101 |
| 6,611,742 B1 | * | 8/2003 | Sand et al. | 701/36 |
| 6,927,685 B2 | * | 8/2005 | Wathen | 340/539.1 |

* cited by examiner

*Primary Examiner*—Daryl C Pope
(74) *Attorney, Agent, or Firm*—Millen White Zelano & Branigan P.C.

(57) ABSTRACT

This invention relates to a vehicle security system. The invention provides a vehicle security system which can be armed and disarmed via a remote control device, e.g. an RF device. The system includes also sensing means which can sense a predetermined event indicative of the presence of a person at the vehicle, such as knocking on the vehicle. For disarming the system, it requires a disarm signal from a compatible remote control device as well as the predetermined event to occur within a predetermined short time period. Where a number of such systems are installed on a number of vehicles on the same lot, e.g. a dealership showroom, and are armed, one of them may be selectively disarmed via a remote control device common to all of the systems. Only the system which senses the predetermined event in addition to a disarm signal will be disarmed.

11 Claims, 1 Drawing Sheet

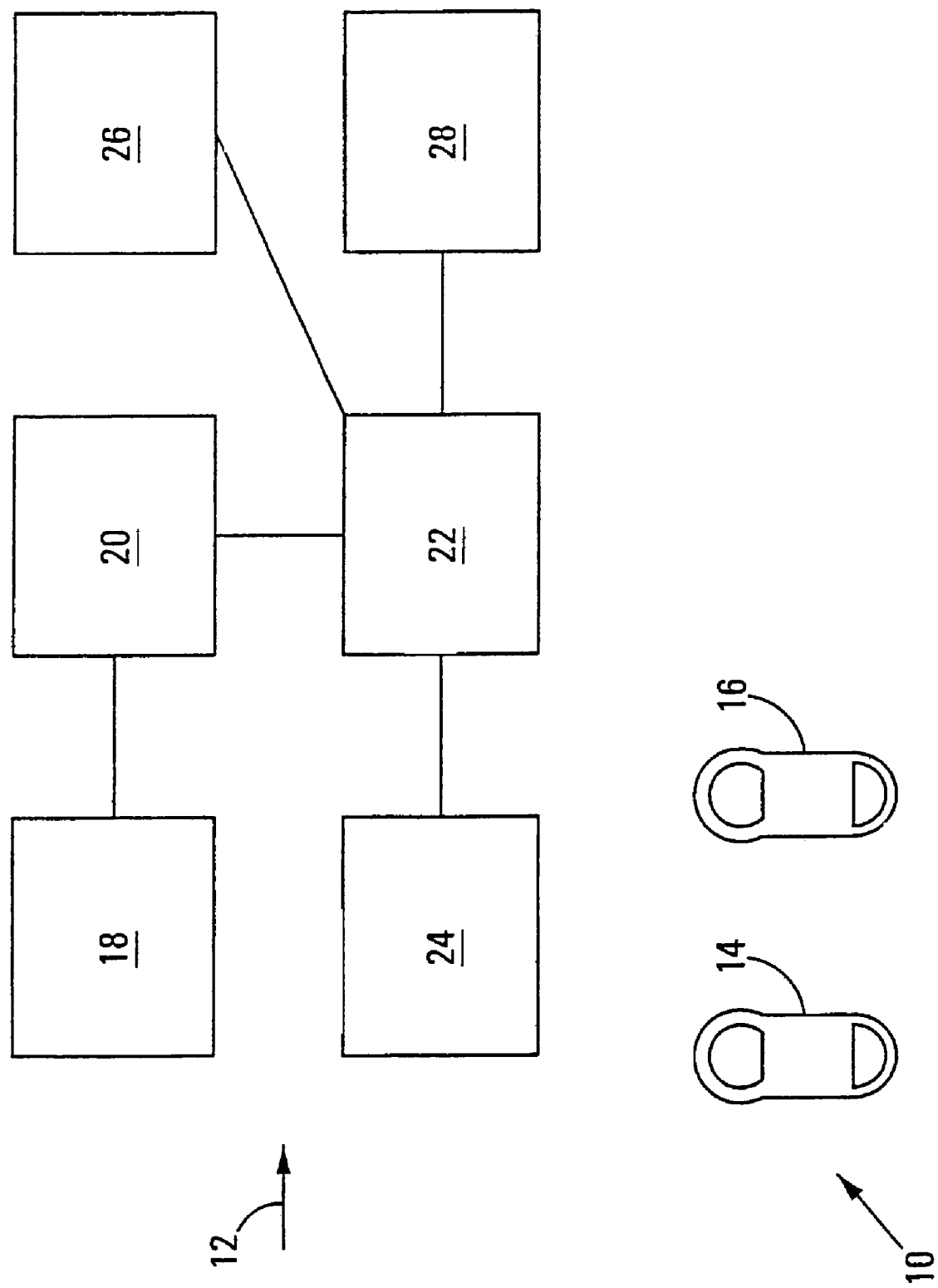

VEHICLE SECURITY SYSTEM

THIS INVENTION relates to a vehicle security system.

The invention relates particularly to a vehicle security system of a type that serves, when installed onboard a vehicle, as at least one of an alarm system, an immobilizer system, means for locking and unlocking at least the driver's door of a vehicle, and the like. The system can be switched between an armed and a disarmed state. Any reference herein to a security system must be interpreted as a reference to a system of this general type.

Reference will herein be made to alarm means of an alarm system. This is the means via which it operatively warns of a particular trigger event to attract the attention of the person responsible for the system. The alarm means may include an audio annunciator, such as a beeper or a siren.

In the case of a security system serving as an alarm system, it has sensing means for sensing at least one type of trigger event and alarm means for warning when such a trigger event has been sensed whilst the security system is armed. In the case of a security system serving as an immobilizer system, it immobilizes the associated vehicle when the security system is in its armed state, but not when it is in its disarmed state. In the case of a security system serving as means for locking and unlocking at least the driver's door of a vehicle, the door is locked when the security system is in its armed state and unlocked when it is in its disarmed state.

Insofar as the features and operation of security systems of the general types referred to above are well known, they will not be elaborated on herein.

It is known, particularly where vehicles do not have vehicle security systems as standard equipment, for vehicle dealerships to install a vehicle security system in each such vehicle on display for sale in their show areas. This is commonly referred to as "preloading" of a vehicle with a security system and vehicles are thereby effectively "protected", while on display in the show areas of the dealerships. In the case of some dealerships, the security systems on all vehicles on display are, for the sake of convenience, set to be armed and disarmed via a number of remote control units, all emitting identical signals and issued to authorized persons, including salesmen. As such, should a salesman wish to demonstrate a particular vehicle to a customer, he operates his remote control unit to disarm the security system of the vehicle. This causes the security system of all the vehicles within the range of the unit to respond. This clearly is undesirable. It is an aim of the current invention to at least ameliorate this type of problem.

According to the invention there is provided a vehicle security system, including an electronic circuit including, in an operative configuration thereof onboard a motor vehicle, a receiver for receiving a predetermined disarm signal from a compatible transmitter, for switching the circuit to a disarmed state when in an armed state;

sensing means for detecting a predetermined event indicative of the presence of a person at the vehicle; and alarm means for warning, when the circuit is in its armed state, of a breach of security of the vehicle in response to a predetermined trigger event, the circuit being configured to, when in its armed state, require for switching into its disarmed state both reception of the predetermined disarm signal and the detection of the predetermined event occurring within a predetermined time period.

As such, in the dealership situation described above, all vehicles on display in the display area may have a security device, in accordance with the invention, installed thereon. All of these may be controllable via one of a number of remote transmitter units, e.g. manually operable remote control units, all emitting identical signals. Normally, all the vehicles will have their security systems in their armed state. Should a salesman wish to demonstrate a particular vehicle to a customer, he merely, within the predetermined time period, both uses the remote transmitter unit to transmit the required disarm signal and causes the event indicative of his presence at the vehicle, which is then sensed by the sensing means of the security system of the vehicle. The security system responds by switching into its disarmed state. Although the security systems of at least some of the other vehicles will receive the same disarm signal, they will not respond thereto unless the presence of a person is detected by them also within the required time period. The requirement of an event indicative of the presence of a person at a particular vehicle need not apply to the arming of its security system, as the system may be configured to ignore an armed signal if it is already armed.

In accordance with the invention, the vehicle security system may provide for the predetermined time period between receiving the predetermined disarm signal and detecting the predetermined event indicative of the presence of a person at the relevant vehicle to be in the range of 0.5 to 10 seconds.

The receiver of the vehicle security system typically is an RF receiver that can receive the required predetermined disarm signal from a compatible RF transmitter, particularly any one of the number of remote transmitter units as referred to above.

The vehicle security system of the invention further may be configured to, upon detecting an event indicative of the presence of a person at the vehicle, emit a warning of the presence of the system. The predetermined event may be the mere presentation of a person at the vehicle, the sensing means thus including a sensor for detecting such presentation. Such a sensor may be one of a microwave sensor and an infra-red sensor, and the like. The predetermined event as above envisaged particularly may be the presentation of a person at a predetermined location alongside the vehicle.

The sensor as above envisaged clearly may serve also as an intruder sensor for detecting a trigger event for the alarm means in the form of intrusion of the vehicle.

An alternative embodiment vehicle security system, in accordance with the invention, may provide for the predetermined event indicative of the presence of a person at the vehicle being a shock on the vehicle, the sensing means thus including a shock sensor for detecting such a shock. The shock sensor may be of a type which operatively provides the circuit with feedback as to the severity of a shock sensed thereby. The predetermined event may thus be a shock within a predetermined severity range, excluding severe shocks, as detected by the shock sensor. The vehicle security system may be configured also to, upon the shock sensor sensing a shock within a predetermined range, excluding severe shocks, emit a warning of the presence of the system. Also, a shock, within a predetermined severity range constituting severe shocks, as sensed by the shock sensor, may be a trigger event for the alarm means.

The circuit of the vehicle security system of the invention may be configured also to, upon its receiver receiving a predetermined other disarm signal when the circuit is in its armed state, switch to its disarmed state without the requirement of detection of an event indicative of the presence of a person at the vehicle. Such switching of the circuit from its armed state to its disarmed state upon receipt of the said predetermined other signal may be enabled upon this equivalent operation in response to the said predetermined disarm signal being received, being disabled. As such, in the case of the dealership situation referred to above, upon the sale of a particular vehicle, arming and disarming of its security system via the remote control units of salesmen may be disabled and same via a dedicated remote control unit, to be provided to a buyer of the vehicle, may be enabled. The system also may be configured so that it does not require the sensing of an event indicative of the presence of a person for disarming itself in response to receiving a disarm signal from the latter remote control unit.

The vehicle security system of the invention may be configured to induce locking and unlocking of the vehicle in response to arming and disarming, respectively, of the circuit. Still further, the system may be configured to induce immobilizing and mobilizing of the vehicle in response to arming and disarming, respectively, of the circuit.

The vehicle security system of the invention may include also at least one remotely operable transmitter unit, e.g. a remote control unit, for transmitting to the receiver signals for arming and disarming the circuit thereof. It will be understood in particular in this regard that the system will include a plurality of remotely operable transmitter units which will, in the dealership situation referred to, be in the possession of predetermined salesmen, while an additional remotely operable transmitter unit for a buyer of a vehicle as envisaged above also may be provided as a part of the security system.

The security system of the invention is defined above with reference to its use in relation to a vehicle dealership. It must be appreciated, however, that it may similarly be used on any vehicle which can accommodate its features and at any time.

The features of the security system of the invention are highly variable. As such, the invention extends to all security systems incorporating the essential features of the security system of the invention, as defined herein.

The invention is described below, by way of example, with reference to and as illustrated in the accompanying diagrammatic drawings in the form of a flow diagram, which illustrates the operation of an embodiment of a security system, in accordance with the invention.

In the drawing, a security system, in accordance with the invention, is designated generally by the reference numeral 10. It includes an electronic circuit 12, installed onboard a vehicle (not shown), say vehicle X, a first remote transmitter unit in the form of a first manually operable hand held remote control unit 14 and a second, similar, unit 16. Vehicle X particularly is one of, say approximately fifty vehicles (not shown) in a show area of a motor vehicle dealership. Each of the approximately fifty vehicles referred to has a security system identical to the security system 10 installed therein. Normally, all the vehicles will have their security systems in their armed states.

The circuit 12 includes sensing means. The sensing means includes a shock sensor 18, mounted inside the passenger compartment of vehicle X, and an analogue to digital converter 20. The circuit 12 includes also a processor 22, which has a memory and a timer; an RF receiver 24; alarm means, particularly an audio annunciator, in the form of a siren 26; and a subsystem 28 which interfaces with vehicle X to effect locking and unlocking of the doors of the vehicle and to control immobilization of the vehicle. The purpose of all of these parts will become apparent from the remainder of this description.

The shock sensor 18 can sense shocks caused by events such as knocks on the body or windows of vehicle X, grabbing of its door handle, or bumping against the vehicle. For each shock, the converter 20 receives an analogue input from the sensor 18 and converts it into one of three values corresponding to shocks of a severity within one of three predetermined ranges corresponding, respectively, to light shocks, shocks of medium severity, and severe shocks. It transmits this value to the processor 22. Via the receiver 24, the circuit 12 can receive RF signals for arming and disarming the system 10.

Should a salesman wish to demonstrate vehicle X to a customer, he takes the remote control unit 14 and walks to the vehicle. He operates the unit 14 to transmit a disarm signal to the receiver 24. The processor 22 registers this signal and stores it in its memory. If the salesman now knocks on the body or window of vehicle X in a manner which is sensed by the sensing means as a light shock or a shock of medium severity, particularly within a predetermined time period of, say, five seconds, the alarm system switches into its disarmed state. If such a shock is not sensed within the five second period, the processor 22 erases from its memory the fact that it had received the signal. If, at any time whilst the system 10 is armed, a person knocks on the vehicle in a manner causing the processor 22 to register a severe shock, it will energise the siren 26 to sound at full volume.

Whenever the alarm system is armed and not within a five second period after the receiver 24 has received a disarm signal, knocking on vehicle X which causes the processor 22 to register a shock of medium severity will induce it to energise the siren 26 to sound at a low volume, so as to warn the person performing the knocking of the fact that the alarm system is armed. Should it register a severe shock, it will energise the siren 26 to sound at full volume.

The receiver 24 may be programmed to respond to one or more compatible remote control unit, such as the units 14 and 16. In the example thus far, it was particularly programmed to receive input signals only from the unit 14. Upon vehicle X being sold, the dealership will program the receiver 24 to no longer respond to the unit 14, but only to the unit 16. The circuit 12 is configured to, upon receiving a disarm signal from the unit 16, immediately disarm the entire security system 10. It may, alternatively, have been configured to operate with the unit 16 in identical fashion to that explained above in relation to the unit 14. The alarm system of the invention may alternatively be configured to require, for disarming, a shock on an associated vehicle prior to receiving a disarm signal, but both events within a predetermined time period. It may, yet alternatively, be configured to merely require the receiving of the disarm signal and the sensing of a shock to occur within the same predetermined period, irrespective of the order of occurrence.

An alternative embodiment of the security system of the invention (not illustrated) may employ sensing means which can sense the presence of a person at a vehicle on which the system is installed. The sensor may be in the form of a motion sensor, e.g. a microwave sensor or an infra-red sensor. The system may operate in similar fashion to the mode of operation of the system in the example above. However, instead of requiring a person to indicate his presence to the system by knocking on a vehicle, he need merely be at a predetermined position relative to a vehicle on which the system is installed, e.g. within a predetermined range. The system may be configured to, whilst in its armed state and not within the predetermined period after receiving a disarm signal from a remote transmitter unit, respond to a person bringing his face into close proximity of a window of the vehicle, respond by emitting a low key warning intended only for that person to warn him of the fact that the security system is armed. It may be configured to be capable of detecting when a person is inside the vehicle and, when detecting such an event whilst the system is armed and not within the said predetermined period, trigger alarm means thereof.

Clearly, the features and operation of the security system of the invention is highly variable. Additional sensors may be added to it or some of the elements referred to in this description may be omitted. It must be understood, however, that the invention extends to any alarm system including the essential features of the alarm system of the invention, as defined herein.

The invention claimed is:

1. A vehicle security system including an electronic circuit including, in an operative configuration thereof onboard a motor vehicle,
   - a receiver for receiving a predetermined disarm signal from a compatible transmitter, for switching the circuit to a disarmed state when in an armed state;
   - sensing means including a shock sensor for detecting a predetermined event of a shock on the vehicle indicative of the presence of a person at the vehicle; and
   - alarm means for warning, when the circuit is in its armed state, of a breach of security of the vehicle in response to a predetermined alarm trigger event,
   - the circuit being configured to, when in its armed state, require for switching into its disarmed state both reception of the predetermined disarm signal and the detection of the predetermined event indicative of the presence of a person at the vehicle occurring within a predetermined time period.

2. A vehicle security system as claimed in claim 1, in which the predetermined time period is in the range of 0.5 to 10s.

3. A vehicle security system as claimed in claim 1, in which the receiver is an RF receiver.

4. A vehicle security system as claimed in claim 1, which is configured to, upon detecting an event indicative of the presence of a person at the vehicle, emit a warning of the presence of the system.

5. A vehicle security system as claimed in claim 1, in which the shock sensor is of a type which operatively provides the circuit with feedback as to the severity of a shock sensed thereby.

6. A vehicle security system as claimed in claim 5, in which the predetermined event is a shock within a predetermined severity range, excluding severe shocks, as detected by the shock sensor.

7. A vehicle security system as claimed in claim 1, which is configured to, upon the shock sensor sensing a shock within a predetermined range, excluding severe shocks, emit a warning of the presence of the system.

8. A vehicle security system as claimed in claim 1, in which a shock, within a predetermined severity range constituting severe shocks, is a trigger event for the alarm means.

9. A vehicle security system as claimed in claim 1, which is configured to induce locking and unlocking of the vehicle in response to arming and disarming, respectively, of the circuit.

10. A vehicle security system as claimed in claim 1, which is configured to induce immobilizing and mobilizing of the vehicle in response to arming and disarming, respectively, of the circuit.

11. A vehicle security system as claimed in claim 1, which includes at least one remotely operable transmitter unit for transmitting to the receiver signals for arming and disarming the circuit thereof.

* * * * *